United States Patent Office 3,006,724
Patented Oct. 31, 1961

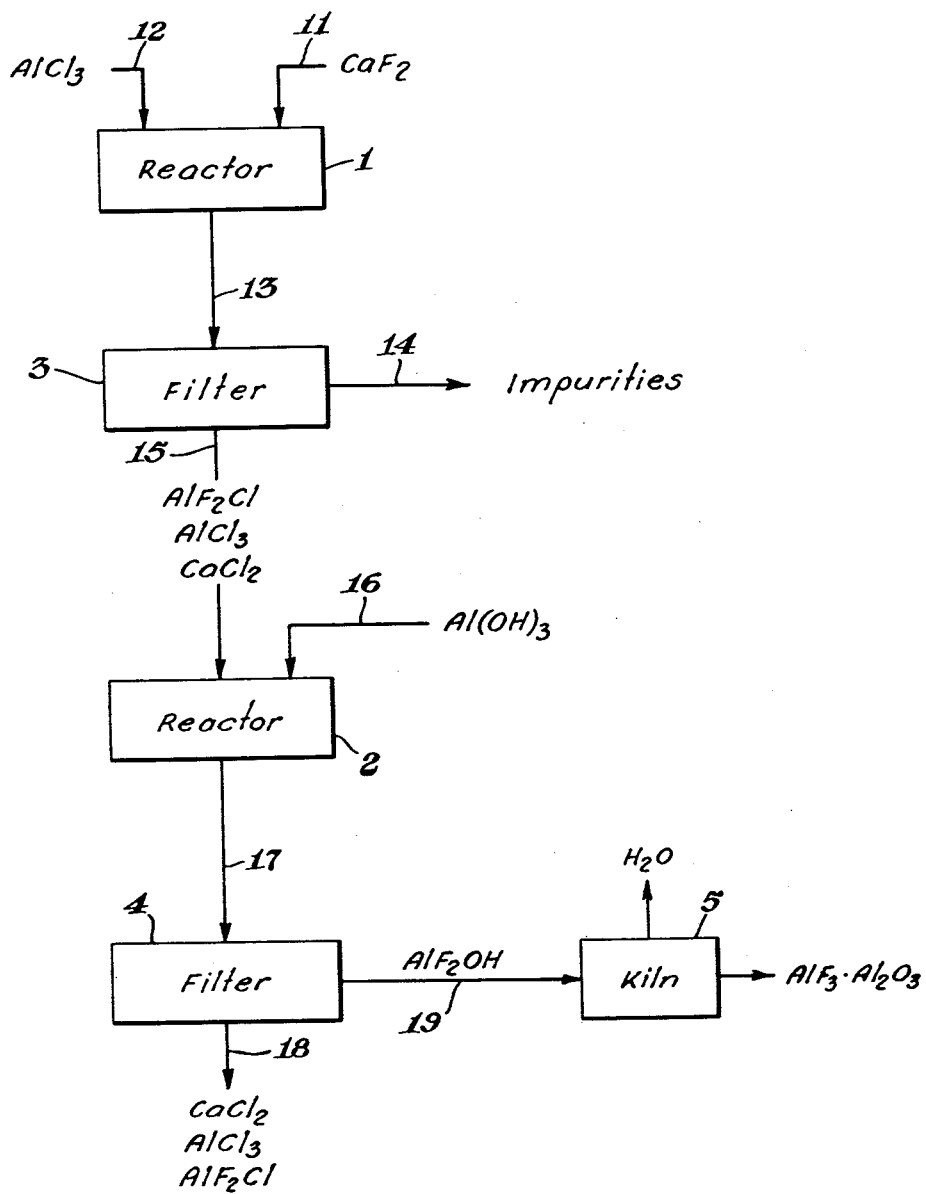

3,006,724
PREPARATION OF ALUMINUM HYDROXY FLUORIDE
Bob R. Harrell, Lake Jackson, Tex., assignor to The Dow Chemical Company, Midland, Mich., a corporation of Delaware
Filed Apr. 10, 1959, Ser. No. 805,475
6 Claims. (Cl. 23—88)

This invention relates to a process for the preparation of aluminum hydroxy fluoride.

Aluminum hydroxy fluoride upon calcination forms a mixture of aluminum fluoride and aluminum oxide. This mixture may be used as a feed constituent in the electrolytic cells in aluminum production in place of aluminum fluoride. The feed added to electrolytic cells must be substantially free of impurities. Thus, the aluminum fluoride which is conventionally used is generally prepared by the reaction of aluminum hydroxide with hydrogen fluoride. Since this is a costly method, it makes the aluminum fluoride expensive. A simple and inexpensive process for the preparation of a high purity aluminum hydroxy fluoride product from calcium fluoride would be greatly desirable. It would provide a cheap source for the aluminum fluoride and aluminum oxide mixture which could be used to replace the aluminum fluoride in electrolytic cell feed.

It is, therefore, among the objects of this invention to provide a simple and inexpensive process for the preparation of aluminum hydroxy fluoride. A further object is to provide a process where calcium fluoride may be used as a source of the fluoride in the preparation of the aluminum hydroxy fluoride. Another object is to provide a process for the preparation of aluminum hydroxy fluoride by the reaction of an aluminum chlorofluoride with aluminum hydroxide or aluminum oxide in the presence of calcium values.

According to the invention, the above and additional objects are attained by intermixing an aqueous solution of aluminum chloride with calcium fluoride in particulate form to react the aluminum chloride with calcium fluoride and obtain aluminum chlorofluoride and calcium chloride in a resulting solution. The resulting solution is separated from the reacted mass, such as by filtration, and the pH adjusted to a pH in the range of 1.2 to 4. An aluminum oxy compound, such as aluminum hydroxide or the active form of aluminum oxide, is intermixed with the solution. The resulting mixture is then heated to a temperature of 40° to 90° C. to react the aluminum chlorofluoride with the aluminum oxy compound to obtain the aluminum hydroxy fluoride as a precipitate. The precipitated aluminum hydroxy fluoride may be easily recovered from the reacted mass as by filtration and calcined to produce an aluminum fluoride-aluminum oxide product suitable for use in the electrolytic production of aluminum.

The process is diagrammatically illustrated in the attached drawing. Since according to the invention aluminum hydroxyfluoride is prepared without the use of hydrofluoric acid, relatively simple equipment may be used. In the process, two reactions are involved which may be illustrated as follows:

(1) 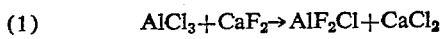  $AlCl_3 + CaF_2 \rightarrow AlF_2Cl + CaCl_2$ (2)   $3AlF_2Cl + Al(OH)_3 \rightarrow 3AlF_2OH + AlCl_3$ In the drawing, two reactors, numbered 1 and 2, respectively, are shown in which the above reactions are carried out. Also two filters numbered 3 and 4 and a kiln 5 are shown interconnected with the reactors by lines or means for moving the product from one piece of equipment to another.

In the process as illustrated, calcium fluoride in particulate form and an aqueous aluminum chloride solution are introduced into reactor 1 through lines 11 and 12, respectively. The aluminum chloride and calcium fluoride are reacted to obtain aluminum chlorofluoride and calcium chloride. From reactor 1 the reacted mass is discharged to filter 3 by means of line 13. Upon filtraiton of the reacted mass, all of the unreacted calcium fluoride and the undissolved constituents which the calcium fluoride may have contained are removed and discharged to waste or for reprocessing by means of line 14. The filtrate or solution containing the aluminum chlorofluoride, calcium chloride, and some unreacted aluminum chloride is passed through line 15 to reactor 2. Aluminum hydroxide is added by means of line 16 to reactor 2 where it is reacted with the aluminum chlorofluoride in the filtrate. In the reaction, aluminum hydroxy fluoride which is relatively insoluble precipitates out. The resulting slurry obtained in reactor 2 is passed by means of line 17 to filter 4 where the aluminum hydroxy fluoride is separated from the resulting mother liquor. The filtrate or the mother liquor from filter 4 containing the calcium chloride, the unreacted aluminum chloride, and the unreacted aluminum chlorofluoride may be passed to storage through line 18 after which it may be processed by known means (not shown) to recover the unreacted aluminum chloride and aluminum chlorofluoride.

The aluminum hydroxy fluoride obtained in the process may be calcined to produce the aluminum fluoride-aluminum oxide product. As shown, the aluminum hydroxyfluoride obtained from filter 4 is passed to kiln 5 by means of line 19. In kiln 5 the aluminum hydroxy fluoride is heated to a temperature in the range of 350° to 600° C. A molecule of water is removed from the aluminum hydroxy fluoride and a solid mixture of aluminum fluoride and aluminum oxide is obtained which may be used as cell feed in place of aluminum fluoride.

To obtain the aluminum hydroxy fluoride as a precipitate of desired purity in the presence of calcium values, the reaction of aluminum chlorofluoride with aluminum hydroxide or the active form of aluminum oxide must be carried out under closely controlled conditions.

Theoretically, 3 moles of aluminum chlorofluoride react with 1 mole of aluminum hydroxide to give 3 moles of aluminum hydroxy fluoride. Although stoichiometric amounts of aluminum hydroxide and aluminum chlorofluoride may be used, generally a stoichiometric excess of aluminum chlorofluoride is used. A slight stoichiometric excess in the range of 10 to 20 percent may be advantageously used, but at times as high as a 300 percent excess may be employed. The excess helps to rapidly react substantially all of the aluminum hydroxide or aluminum oxide intermixed with the aluminum chlorofluoride in the solution. Since the aluminum hydroxy fluoride product obtained is insoluble and is recovered by filtration, it is desirable to react all of the aluminum oxy compound. Otherwise, some of the unreacted compound may be recovered with the aluminum hydroxy fluoride product upon filtration of the reacted mass.

A solution of aluminum chlorofluoride containing from 50 to 250 grams per liter of aluminum chlorofluoride is generally reacted with the aluminum oxy compound. With the concentration in the above range, relatively large crystals of aluminum hydroxy fluoride are obtained which may be rapidly filtered and separated from the mother liquor. Fine and difficult to filter crystals are obtained with a solution having a concentration greater than 250 grams per liter. With a solution containing less than 50 grams per liter, the reaction rate decreases appreciably and only a small amount of aluminum hydroxy fluoride is recovered per given volume of solution reacted. A concentration of from 80 to 110 grams of aluminum chlorofluoride per liter is preferred.

To obtain the desired reaction of the aluminum chlorofluoride with the aluminum oxy compound, the pH of the aluminum chlorofluoride solution prior to the addition of aluminum oxy compound must be within the range of 1.2 to 4. At a pH below 1.2 the reaction between aluminum chlorofluoride and the aluminum oxy compound to give the aluminum hydroxy fluoride does not appear to take place. It is generally preferred to maintain the pH in the range of 2 to 3, although to a certain extent the optimum pH depends upon the concentration of the aluminum chlorofluoride solution reacted. With a relatively dilute solution, a pH higher than 1.2 may have to be used to obtain a practical yield, while with a more concentrated solution a pH as low as 1.2 may be satisfactorily employed. However, when the pH is above 4, even with the dilute solutions, an undesired precipitate is obtained which is believed to be calcium hydroxide.

A reaction temperature in the range of 40 to 90° C. is generally employed. High yield of aluminum hydroxy fluoride is obtained at a temperature in this range which decreases if the reaction temperature is increased above 90° C. or decreased below 40° C. The optimum yields are realized when the temperature of the reaction is maintained in the range of 60° to 70° C. When a solution containing from 50 to 250 grams per liter of aluminum chlorofluoride is reacted with the aluminum hydroxide and the amount of the aluminum chlorofluoride used is in a stoichiometric excess of the proportions indicated in the second equation above, substantially all of the aluminum hydroxide is reacted in a reaction time of around 2 to 4 hours. With more dilute solution and a smaller excess of aluminum chlorofluoride longer times may be necessary. However, at the preferred conditions of temperature, concentration, and pH, the reaction is generally substantially completed in about 4 to 6 hours.

The reaction of calcium fluoride or fluorspar with an aqueous solution of aluminum chloride may be readily carried out at a temperature in the range of 80° to 200° C. Since it is generally preferred not to employ a super atmospheric pressure, a reaction temperature in the range of 90° to 100° C. is most often used. At the reaction temperature of 90° to 100° C., a substantial conversion of the fluorspar and aluminum chloride is usually obtained in a reaction time of 1 to 6 hours. The reaction time can be considerably decreased by employing temperatures above 100° C., but a pressure reactor has to be used and the reaction carried out under pressure to keep the water in the reaction mixture from vaporizing.

While the particle size of the calcium fluoride or fluorspar used is not critical, generally calcium fluoride is ground to give a product having a particle size such that it will pass through a No. 50 but be retained on a No. 200 sieve, U.S. Sieve Series. The concentration of the aluminum chloride solution and the ratio of the solution to calcium fluoride used may be widely varied. However, generally the concentration and proportions selected are such that, after filtration of the reacted mass, the solution obtained may be reacted with aluminum hydroxide without further processing. The solution has the desired pH and a concentration of aluminum chlorofluoride generally in the range of 80 to 100 grams per liter. If the pH of the solution obtained is above the desired range, it is most often adjusted by addition of more aluminum chloride.

The following examples further illustrate the invention.

*Example I*

Fluorspar ground to pass through a No. 100 U.S. Sieve Series, was reacted with aluminum chloride at a temperature of 100° C. and atmospheric pressure for 4 hours. The resulting reaction product was filtered and a solution containing 58 grams of aluminum chlorofluoride per liter was obtained.

To 500 milliliters of this solution hydrochloric acid was added until a pH of 3 was obtained. To this solution 6 grams of aluminum hydroxide were added. The mixture was agitated for 16 hours and maintained at a temperature of 70° C. A slurry was obtained which upon filtration and drying gave about 19 grams of a solid product. Upon analysis of the filtrate and the solid product it was found that approximately 24 grams of aluminum chlorofluoride had been reacted to give approximately 19 grams of substantially 100 percent aluminum hydroxyfluoride.

The aluminum hydroxy fluoride product was calcined at 500° C. to yield a product which contained 76 percent by weight of aluminum fluoride and the remainder aluminum oxide.

*Example II*

In a manner described in Example I, an aluminum chlorofluoride solution containing approximately 110 grams per liter was obtained by the reaction of aluminum chloride with calcium fluoride. The pH of this solution was adjusted to 2.6. To 500 milliliters of this solution, 10 grams of aluminum hydroxide were added. The mixture was agitated and heated to a temperature of 70° C. for 4 hours to react the aluminum chlorofluoride with the aluminum hydroxide. The resulting slurry obtained in reacting the aluminum hydroxide with the aluminum chlorofluoride for 4 hours was filtered. The solid product obtained was dried in an oven at 110° C. to yield 31.5 grams of a product which upon analysis was found to contain 99 percent aluminum hydroxyfluoride.

*Example III*

In a manner similar to that of Example I, an aluminum chlorofluoride solution containing 63 grams of aluminum chlorofluoride per liter and having a pH of 3 was obtained. To 500 milliliters of this solution, 4 grams of aluminum hydroxide were added and the mixture reacted at 70° C. for 4 hours. Upon filtering the resulting slurry obtained and drying the solid product, 12.5 grams of 99 percent aluminum hydroxy fluoride were obtained.

To illustrate the effect of using a very dilute aluminum chlorofluoride solution at a low pH, a second run was made where to 500 milliliters of an aluminum chlorofluoride solution containing approximately 48 grams of the salt per liter and having a pH of 1.4, 8 grams of aluminum hydroxide were added and reacted for 16 hours at 70° C. In this reaction time, no solid product was obtained.

What is claimed is:

1. A process for the preparation of $AlF_2OH$, which comprises intermixing an aqueous solution of aluminum chloride with particulated calcium fluoride to react the aluminum chloride with the calcium fluoride to obtain calcium chloride and aluminum chlorofluoride in a resulting solution, separating the undissolved constituents of the reacted mass from the resulting solution, adjusting the pH of the separated solution to a pH in the range of 1.2 to 4, intermixing with the pH adjusted solution an aluminum oxy compound selected from the group consisting of the active form of aluminum oxide and aluminum hydroxide, heating the resulting mixture to a temperature of 40° to 90° C. to react the aluminum chlorofluoride to obtain a precipitate of $AlF_2OH$, and recovering the $AlF_2OH$ from the reacted mass.

2. A process for the preparation of $AlF_2OH$, which comprises intermixing an aqueous solution of aluminum chloride with particulated calcium fluoride to react the aluminum chloride with the calcium fluoride to obtain calcium chloride and aluminum chlorofluoride in a resulting solution, said aluminum chloride solution and calcium fluoride being intermixed in proportion such that the resulting solution obtained contains from 50 to 250 grams of aluminum chlorofluoride per liter, separating the undissolved constituents of the reacted mass from the resulting solution, adjusting the pH of the separated solution to a pH in the range of 2 to 3, intermixing aluminum hydroxide with the pH adjusted solution in proportion such that a slight stoichiometric excess of aluminum chlorofluoride is obtained in the resulting mixture, heating the resulting mixture to a temperature of 60° to 70° C. for from 4 to 6 hours to react the aluminum chlorofluoride with aluminum hydroxide to obtain a precipitate of $AlF_2OH$, and recovering the $AlF_2OH$ from the reacted mass.

3. A process for the preparation of $AlF_2OH$ by the reaction of aluminum chlorofluoride with an aluminum oxy compound in the presence of calcium values, which comprises intermixing the aluminum oxy compound selected from the group consisting of aluminum hydroxide and the active form of aluminum oxide with an aqueous solution of aluminum chlorofluoride having a pH in the range of 1.2 to 4, heating the mixture to a temperature in the range of 40° to 90° C. to react the aluminum chlorofluoride with the aluminum oxy compound, and recovering the $AlF_2OH$ formed.

4. A process for the preparation of $AlF_2OH$ by the reaction of aluminum chlorofluoride with an aluminum oxy compound in the presence of calcium values, which comprises intermixing the aluminum oxy compound selected from the group consisting of aluminum hydroxide and the active form of aluminum oxide with a slight stoichiometric excess of an aqueous solution of aluminum chlorofluoride having a pH in the range of 1.2 to 4 and containing from 50 to 250 grams of the aluminum chlorofluoride per liter, heating the mixture to a temperature of 40° to 90° C. to react the aluminum chlorofluoride with the aluminum oxy compound for at least 2 hours, and recovering the $AlF_2OH$ formed.

5. A process according to claim 4 wherein the aluminum oxy compound is aluminum hydroxide.

6. A process for the preparation of $AlF_2OH$ by the reaction of aluminum chlorofluoride with an aluminum hydroxide in the presence of calcium values, which comprises intermixing aluminum hydroxide with a slight stoichiometric excess of an aqueous solution of aluminum chlorofluoride having a pH in the range of 2 to 3 and containing from 80 to 110 grams of the aluminum chlorofluoride per liter, heating the mixture to a temperature of 60° to 70° C. to react the aluminum chlorofluoride with the aluminum oxy compound for from 4 to 6 hours, and recovering the $AlF_2OH$ formed.

References Cited in the file of this patent

UNITED STATES PATENTS

| | | |
|---|---|---|
| 1,872,716 | Finkelstein et al. | Aug. 23, 1932 |
| 1,881,430 | Finkelstein et al. | Oct. 11, 1932 |
| 2,750,257 | Johnson | June 12, 1956 |

FOREIGN PATENTS

| | | |
|---|---|---|
| 525,387 | Great Britain | Aug. 27, 1940 |
| 682,977 | France | Feb. 24, 1930 |

OTHER REFERENCES

Chemical Abstracts, vol. 52, No. 22, page 20955C (Nov. 25, 1958), cites East German Patent 9,988 (Vogel), June 28, 1955.